Feb 14, 1933.                C. W. KUHN ET AL                 1,897,059
                         CONTROLLER FOR ELECTRIC MOTORS
                              Filed Jan. 2, 1932
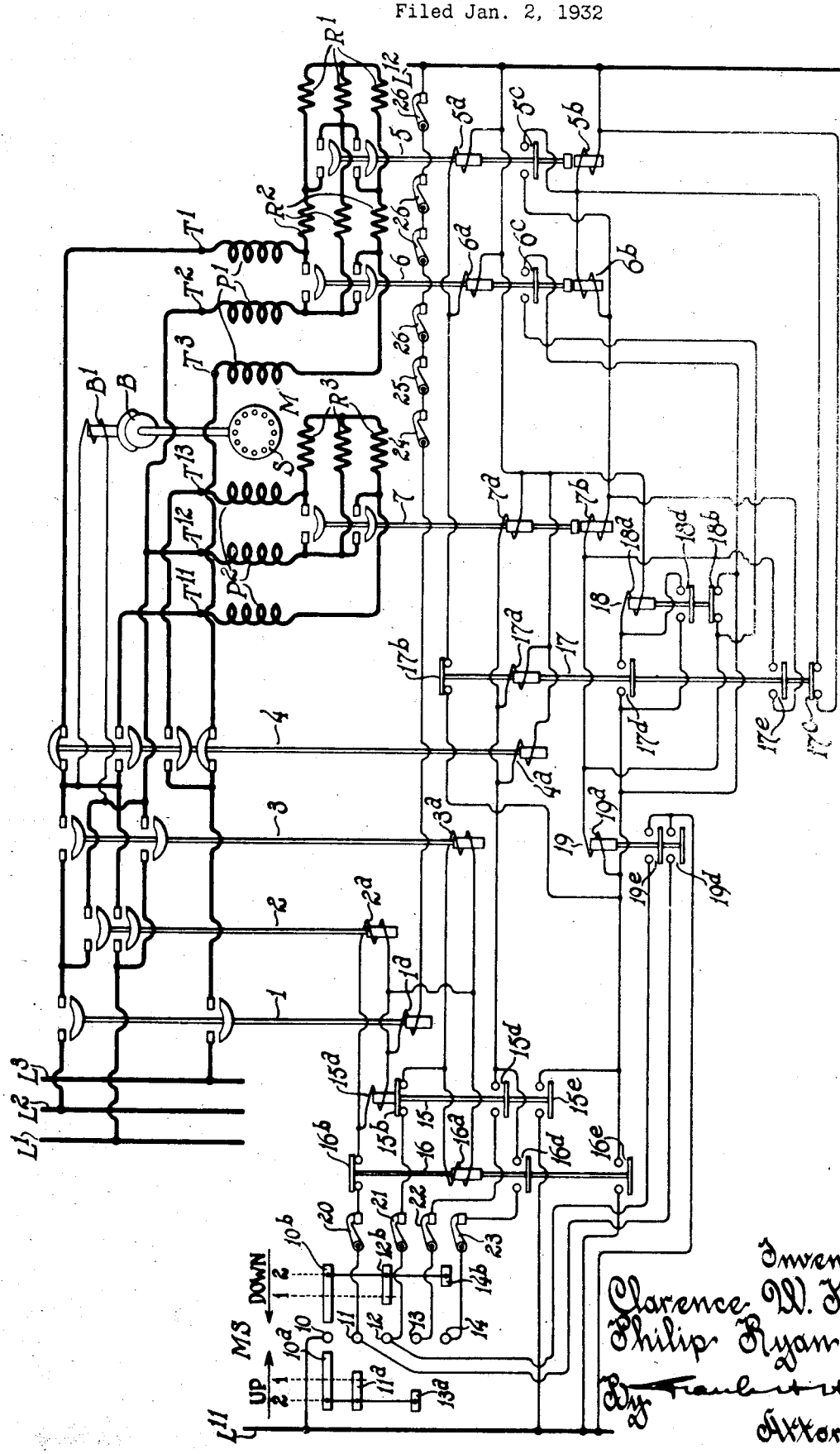
Inventors
Clarence W. Kuhn
Philip Ryan
By Frank H. Hubbard
Attorney Patented Feb. 14, 1933

1,897,059

UNITED STATES PATENT OFFICE

CLARENCE WILBUR KUHN, OF MILWAUKEE, WISCONSIN, AND PHILIP RYAN, OF NEW YORK, N. Y., ASSIGNORS TO CUTLER-HAMMER, INC., OF MILWAUKEE, WISCONSIN, A CORPORATION OF DELAWARE

CONTROLLER FOR ELECTRIC MOTORS

Application filed January 2, 1932. Serial No. 584,368.

This invention relates to controllers for electric motors.

While alternating current elevator systems present problems for which the invention provides a solution, and while the invention is particularly applicable to such systems, nevertheless the invention is applicable generally to controllers for effecting acceleration and deceleration of electric motors.

Acceleration control of direct current motors has heretofore been effected in a very efficient and reliable manner by what are known as inductive time limit controllers, a controller of this type being disclosed in the patent to Clarence T. Evans, No. 1,727,872, of September 10, 1929. The controller disclosed in this patent employs resistance controlling means including switches each of which is provided with a restraining winding, and provision is made for utilizing the self-inductive effect of such windings to delay operation of their associated switches. This type of controller has numerous advantages as for example elimination of timing relays and the more or less complex control connections commonly employed to effect progressive operation of accelerating switches.

The present invention has among its objects to provide an improved motor controller which utilizes inductive control to effect acceleration and graduated braking of the motor in a simple and reliable manner.

Another object is to provide an improved inductive time limit controller for multispeed alternating current motors.

Another object is to provide an elevator system having a multi-speed alternating current driving motor and direct current inductive control means for controlling the rate of acceleration and deceleration of the motor and also stopping thereof after braking.

Various other objects and advantages of the invention will hereinafter appear.

The accompanying drawing diagrammatically illustrates an embodiment of the invention which will now be described, it being understood that the embodiment illustrated is susceptible of modification without departing from the spirit and scope of the appended claims.

Referring to the drawing, the same illustrates the invention as applied to an elevator system having a three phase alternating current driving motor M to be supplied with current from a supply circuit indicated by lines $L^1$, $L^2$ and $L^3$. Said motor is provided with low and high speed primary windings $P^1$ and $P^2$ and a squirrel cage rotor S and the same has a normally engaged brake B associated therewith which is provided with a releasing winding $B^1$.

The power connections for the windings $P^1$ and $P^2$ are controlled by a plurality of switches including a main switch 1, and "up" reversing switch 2, a "down" reversing switch 3 and a slow-fast switch 4. Each of the switches 1 to 4, inclusive, is provided with an operating winding $a$ and two sets of normally open contacts and switch 4 is also provided with two sets of normally closed contacts. As hereinafter set forth when switch 4 is in normal position reversing switches 2 and 3 are operable to selectively establish reverse power connections for the low speed primary winding $P^1$ through the medium of main switch 1, and upon response of switch 4 said reversing switches are operable to selectively establish reverse power connections for the high speed primary winding $P^2$ through the medium of said main switch. Also as hereinafter set forth the releasing winding $B^1$ of brake B is arranged to be connected across lines $L^1$—$L^2$ upon closure of main switch 1 and either of the reversing switches.

The controller also includes electroresponsive switches 5, 6 and 7 for controlling the rate of acceleration and deceleration of motor M. Switches 5 and 6 are responsive to shunt sets of resistances $R^1$ and $R^2$, respectively, which are connected in circuit with the low speed primary winding $P^1$ and switch 7 is responsive to shunt a set of resistances $R^3$ connected in circuit with the high speed primary winding $P^2$. Each of these switches is provided with an operating winding $a$ and a restraining winding $b$ and as hereinafter set forth the latter windings are controlled to delay operation of their associated switches for control of the rate of acceleration and deceleration of motor M. Each of the switches 5 and 6 is also provided with normally open auxiliary contacts c, the purpose of which will be hereinafter set forth.

All of the aforementioned switches are arranged to be energized from a direct current supply circuit indicated by lines $L^{11}$ and $L^{12}$ which is supplied with current from any suitable source as for example a rectifier connected to the above mentioned alternating current supply circuit and are controlled by a master switch MS through the medium of various relays which will be hereinafter described. In elevator systems the master switch MS is mounted in the elevator car for operation by the elevator operator and as shown said switch is provided with stationary contacts 10 to 14, inclusive, and two sets of cooperating movable contact segments $10^a$, $11^a$, $13^a$ and $10^b$, $12^b$, $14^b$ arranged on opposite sides of said stationary contacts.

The relays hereinbefore referred to include an "up" relay 15, a "down" relay 16 and relays 17, 18 and 19 for controlling the rate of acceleration and deceleration of the motor. Each of said relays is provided with an operating winding a and each of the relays 15, 16 and 18 is provided with a set of normally closed contacts b, while relay 17 is provided with two sets of normally closed contacts b and c. Also relay 18 is provided with a single set of normally open contacts d and each of the relays 15, 16, 17 and 19 is provided with two sets of normally open contacts d and e.

In addition to the aforedescribed switches and relays the controller includes normally closed up and down limit switches 20 and 21 which are adapted to be opened when the elevator car moves into given upper and lower limits and normally closed limit switches 22 and 23 adapted to be opened prior to movement of the elevator car into such limits. As hereinafter set forth limit switches 22 and 23 provide for slow-down of the motor while limit switches 20 and 21 provide for stopping thereof. Also limit switches 24 and 25 are provided for stopping of the motor upon travel of the elevator car beyond the above mentioned upper and lower limits and door switches 26 are employed to prevent starting of the motor when any of the landing doors are in open position.

The operation of the aforedescribed controller and the circuit connections therefor will now be more fully described.

Movement of the master switch MS towards the right into its first up position effects response of main switch 1 and up reversing switch 2 by a circuit extending from line $L^{11}$ through contacts 10, $10^a$, $11^a$ and 11 of said master switch, through up limit switch 20, through contacts $16^b$ of down relay 16, through the operating winding $2^a$ of said reversing switch and the operating winding $1^a$ of said main switch and through the overtravel limit switches 24 and 25 and the door switches 26 to line $L^{12}$. Movement of the master switch MS towards the left into its first speed position effects response of main switch 1 and down reversing switch 3 by a circuit extending from line $L^{11}$ through contacts 10, $10^b$, $12^b$ and 12 of said master switch, through down limit switch 21, through contacts $15^b$ of up relay 15, through the operating winding $3^a$ of said reversing switch and the operating winding $1^a$ of said main switch to line $L^{12}$.

Upon response of main switch 1 and reversing switch 2 the terminals $T^1$, $T^2$, $T^3$ of the low speed winding $P^1$ are connected to lines $L^1$, $L^2$, $L^3$, respectively, to provide for operation of the motor at low speed in its up direction and the brake winding $B^1$ is connected across lines $L^1$, $L^2$. Upon response of main switch 1 and reversing switch 3 the brake winding $B^1$ is connected across lines $L^1$—$L^2$ and the terminals $T^1$, $T^2$, $T^3$ of the low speed winding $P^1$ are connected to lines $L^2$, $L^1$, $L^3$, respectively, to provide for operation of the motor at low speed in its down direction.

As will now be set forth, upon establishment of power connections for the low speed winding $P^1$, resistance switch 5 responds immediately to shunt the set of resistances $R^1$, and after a predetermined interval resistance switch 6 responds to shunt the set of resistance $R^2$.

It will be noted that the operating winding $15^a$ of up relay 15 is connected in parallel with the operating winding $2^a$ of the up reversing switch 2 and the operating winding $16^a$ of down relay 16 is connected in parallel with the operating winding $3^a$ of the down reversing switch 3. Thus the up relay 15 is adapted to respond upon establishment of the aforedescribed energizing circuit for main switch 1 and the up reversing switch 2, and the down relay 16 is adapted to respond upon establishment of the aforedescribed energizing circuit for main switch 1 and the down reversing switch 3.

Upon response of either of the relays 15 or 16 the contacts e thereof connect the operating winding $19^a$ of relay 19 and the restraining windings $5^b$, $6^b$ and $7^b$ of resistance switches 5, 6 and 7 in series across lines $L^{11}$—$L^{12}$ and said contacts also connect the operating windings $5^a$ and $6^a$ of resistance switches 5 and 6 in parallel across lines $L^{11}$—$L^{12}$ through the medium of the normally closed contacts $17^b$ of relay 17. At this time the operating winding $19^a$ of relay 19 is shunted by contacts $18^b$ of relay 18 and the restraining winding $5^b$ of resistance switch 5 is shunted by contacts $17^c$ of relay 17 and said windings are therefor deenergized. Thus upon response of either of the relays 15 or 16 resistance switch 5 responds immediately under the action of its operating winding 5$^a$ to shunt the set of resistances R$^1$, and resistance switch 6 is held in normal position against the action of its operating winding 6$^a$ by its restraining winding 6$^b$. Upon response of resistance switch 5 the contacts 5$^c$ thereof shunt the restraining winding 6$^b$ and the self inductance of said winding then maintains it effective for a given period to delay response of resistance switch 6 under the action of its operating winding 6$^a$.

Upon movement of the master switch MS towards the right into its second up position the aforedescribed energizing circuit for main switch 1, up reversing switch 2 and up relay 15 is maintained and the slow-fast switch 4 is energized by a circuit extending from line L$^{11}$ through contacts 10, 10$^a$, 13$^a$ and 13 of the master switch, through the slowdown limit switch 22, through contacts 15$^d$ of the up relay and through the operating winding 4$^a$ of the slow-fast switch 4 to line L$^{12}$. With the main switch 1 and up reversing switch 2 in closed position response of switch 4 interrupts the power connections for the low speed winding P$^1$ and connects terminals T$^{11}$, T$^{12}$, T$^{13}$ of the high speed winding P$^2$ to lines L$^1$, L$^2$ and L$^3$, respectively, for operation of the motor at high speed in its up direction.

Upon movement of the master switch MS towards the left into its second down position the aforedescribed energizing circuit for main switch 1, down reversing switch 3 and down relay 16 is maintained and the slow-fast switch 4 is energized by a circuit extending line L$^{11}$ through contacts 10, 10$^b$, 14$^b$ and 14 of the master switch, through slowdown limit switch 23, through contacts 16$^d$ of down relay 16 and through the operating winding 4$^a$ of the slow-fast switch 4 to line L$^{12}$. With main switch 1 and reversing switch 3 in closed position response of switch 4 interrupts the aforedescribed power connections for low speed winding P$^1$ and connects the terminals T$^{11}$, T$^{12}$ and T$^{13}$ of the high speed winding P$^2$ to lines L$^2$, L$^1$ and L$^3$, respectively, for operation of the motor at high speed in its down direction.

It will be noted that the operating winding 17$^a$ of relay 17 and the operating winding 7$^a$ of resistance switch 7 are connected in parallel with the operating winding 4$^a$ of the slow-fast switch 4. Thus upon energization of the slow-fast switch 4 to establish high speed power connections for the motor, relay 17 responds immediately, and resistance switch 7 tends to responds under the action of its operating winding 7$^a$ but is held in normal position by its restraining winding 7$^b$ which is energized as herein before described.

Upon response of relay 17 the contacts 17$^b$ thereof interrupt the aforedescribed energizing circuit for the operating windings 5$^a$, and 6$^a$ of resistance switches 5 and 6 to provide for dropping out of said switches and the contacts 17$^e$ of said relay close to shunt the restraining winding 7$^b$ of resistance switch 7. Restraining winding 7$^b$ then acts by self induction to hold switch 7 in open position but after a given interval said winding becomes ineffective and said switch then responds under the action of its operating winding 7$^a$ to exclude the set of resistances R$^3$ in circuit with the high speed winding P$^2$. Upon dropping out of resistance switches 5 and 6 the restraining winding 5$^b$ of the former switch is energized since contacts 17$^c$ of relay 17 are now in open position and the restraining winding 6$^b$ of the latter switch is energized by opening of contacts 5$^c$ of the former switch.

Response of relay 17 effects response of relay 18 by establishing an energizing circuit from line L$^{11}$ through contacts 15$^e$ of the up relay or contacts 16$^e$ of the down relay, as the case may be, through contacts 17$^d$ of relay 17 and through the operating winding 18$^a$ of relay 18 to line L$^{12}$. Upon response of relay 18 a maintaining circuit therefor is established by closure of its contacts 18$^d$ which shunt the contacts 17$^d$ of relay 17. Also upon response of relay 18 the contacts 18$^b$ thereof open to interrupt the shunt circuit around the operating winding 19$^a$ of relay 19 which at this time is connected as hereinbefore set forth, across lines L$^{11}$—L$^{12}$ in series with the restraining windings 5$^b$, 6$^b$ and 7$^b$ of the resistance switches. Relay 19 therefore responds immediately following energization of the high speed winding P$^2$ of the motor and the same establishes circuit from line L$^{11}$ through its contacts 19$^d$ and 19$^e$ to contacts 11 and 12, respectively, of the master switch MS.

Movement of the master switch MS out of either of its second speed positions interrupts the aforedescribed energizing circuit for the operating windings of the slow-fast switch 4, relay 17 and resistance switch 7. The slow-fast switch 4 then returns to normal position to interrupt the power connections for the high speed winding P$^2$ and to re-establish the power connections for the low speed winding P$^1$ and the motor is thus braked with the two sets of resistances R$^1$ and R$^2$ included in circuit with said low speed winding. Also relay 17 drops out and its contacts 17$^b$ and 17$^c$ close to re-establish the aforedescribed energizing circuit for the operating winding 5$^a$ and 6$^a$ of reversing switches 5 and 6 and to shunt the restraining winding 5$^b$ of resistance switch 5. Restraining winding 5$^b$ then acts by self-induction to hold resistance switch 5 in open position but after a given interval said winding becomes ineffective and said switch responds under the action of its operating winding 5$^a$. The set of resistances R¹ is then excluded from circuit with the low speed winding P¹ to increase the braking effect on the motor. Upon response of resistance switch 5 the contacts 5ᶜ thereof shunt restraining winding 6ᵇ. Winding 6ᵇ then acts by self-induction to hold resistance switch 6 in open position but after a given interval said winding becomes ineffective and said switch responds under the action of its operating winding 6ᵃ. The set of resistance R² is then excluded from circuit with the low speed winding P¹ to further increase the braking effect on the motor.

It will be noted that upon dropping out of the relay 17, relay 18 is maintained energized through the medium of its contacts 18ᵈ and since the contacts 18ᵇ of the latter relay are open relay 19 is also maintained in its attracted position. Thus upon return of the master switch MS from its second up position to off position the contacts 19ᵉ of relay 19 maintain the aforedescribed energizing circuit for up relay 15, reversing switch 2 and main switch 1. Also upon return of the master switch to off position from its second down position the aforedescribed energizing circuit for down relay 16, down reversing switch 3 and main switch 1 is maintained by contacts 19ᵈ of relay 19. It is therefor apparent that when master switch is moved from either of its second speed positions to off position the low speed winding will be energized to effect braking of the motor and resistance switches 5 and 6 will operate in the manner hereinbefore described to gradually increase the braking effect.

Upon response of resistance switch 6 the contacts 6ᶜ thereof shunt the operating winding 19ᵃ and said winding then acts by self-induction to hold relay 19 in its attracted position for an interval which is a function of the self-inductance of said winding. After such interval relay 19 drops out to interrupt the circuits maintained thereby and the power connections for the low speed winding are thus interrupted and the up relay 15 or down relay 16, as the case may be, drops out and interrupts the maintaining circuit for relay 18.

In connection with the foregoing it should be noted that the motor can only be started when all of the door switches 26 are in closed position. Also it should be noted that upon opening of either of the slow down limit switches 22 or 23 the slow-fast switch 4 and relay 17 are deenergized to effect braking of the motor in the manner hereinbefore described and opening of up limit switch 20, down limit switch 21 or the overtravel limit switches 24 or 25 provides for stopping of the motor.

What we claim as new and desire to secure by Letters Patent is:

1. The combination with an alternating current motor having separate primary windings for slow and high speed operation thereof, of means for controlling the power connections for said windings to provide for operation of the motor at slow or high speeds selectively and to also provide for self braking action thereof, resistance varying means associated with said slow speed winding and responsive to control the rate of acceleration and deceleration of said motor, and direct current control means associated with said resistance varying means for controlling the resistance varying action thereof in different stages, said control means having an inherently transient effect and including means providing for differentiation of its arresting action upon acceleration and deceleration of said motor.

2. In a motor controller, in combination, a plurality of electroresponsive accelerating switches each having a winding associated therewith to restrain the same against response, a direct current supply circuit for said windings, means for connecting said windings in series with each other across said supply circuit upon starting of the motor and means for controlling shunt circuits for said windings to render said switches responsive in a given sequence but subject to a delay which is a function of the self inductance of their associated restraining windings.

3. In a motor controller, in combination, an electroresponsive switch for controlling acceleration and deceleration of the motor, said switch having a direct current winding associated therewith to restrain the same against response, means for establishing an energizing circuit for said winding upon starting of the motor and means for controlling a shunt circuit for said restraining winding to render said switch responsive immediately upon starting of the motor and to render the same responsive after a delay which is a function of the self inductance of its restraining winding upon braking of the motor.

4. In a motor controller, in combination, a pair of electroresponsive switches for controlling acceleration and deceleration of the motor, each of said switches having a winding associated therewith to restrain the same against response, a direct current supply circuit for said windings, means for connecting said windings in series across said supply circuit upon starting of the motor, means for controlling a shunt circuit for the restraining winding of one of said switches to render said switch responsive immediately upon starting of the motor and to render the same responsive after a given delay which is a function of the self inductance of its restraining winding upon braking of the motor, and means for controlling a shunt circuit for the restraining winding of the other of said switches to render the latter switch responsive upon response of said former switch, but subject to a delay which is a function of the self inductance of its associated restraining winding.

5. The combination with an alternating current motor having slow and high speed primary windings, control means for said motor including a master switch movable out of a given off position into a low speed position to energize said slow speed winding and into a high speed position to deenergize said slow speed winding and to energize said high speed winding, an electroresponsive switch for energizing said slow speed winding to provide for braking of said motor upon return of said master switch from its high speed position to off position, said switch having a direct current operating coil, means for energizing said switch upon energization of said high speed winding and for maintaining the same energized upon return of said master switch to off position and means for shunting the operating coil of said switch at a given period in the braking operation of said motor to provide for delayed return of said switch to normal position.

6. The combination with a multi-speed alternating current motor, of a plurality of electroresponsive switches for controlling the rate of acceleration and deceleration of said motor, each of said switches having a direct current restraining winding associated therewith for preventing response thereof, and means for controlling energization of said restraining windings to provide for response of said switches in a given sequence upon starting of said motor and also upon braking thereof, said means providing for delay in the operation of certain of said switches during acceleration and also deceleration of said motor by self inductive action of their associated restraining windings and for delay in the operation of another of said switches by self inductive action of its associated restraining winding but only during deceleration of said motor.

7. In a controller for multi-speed alternating current motors, in combination, means for controlling the rate of acceleration of the motor and also the rate of deceleration of the motor upon braking thereof, said means including a plurality of electroresponsive resistance controlling switches each having a winding associated therewith for preventing response thereof, a direct current supply circuit for said windings, means for connecting said windings in series across said supply circuit upon starting of said motor and means controlling said restraining windings to provide for operation of said switches in a given sequence upon starting of the motor and also upon deceleration thereof, said means providing a delay in the operation of certain of said switches during acceleration and deceleration of said motor by self inductive action of their associated restraining windings, and for a delay in the operation of another of said switches by self inductive action of its associated restraining winding, but only during deceleration of said motor.

8. In a direct current operated controller for multi-speed alternating current motors, in combination, direct current electroresponsive switches operable to selectively establish slow and high speed power connections for the motor, a master switch for controlling said switches, a plurality of direct current accelerating switches associated with the low speed winding of the motor for controlling the rate of acceleration of the motor and also the rate of deceleration upon braking thereof, each of said switches having an operating winding and a restraining winding associated therewith, means for energizing the operating windings of said resistance switches upon establishment of slow speed power connections for the motor and for controlling energization of said restraining windings to provide for response of said resistance switches in a given sequence, and for self inductive action of certain of said restraining windings upon starting of the motor and upon braking thereof and for self inductive action of certain other of said restraining windings upon braking of the motor.

In witness whereof, we have hereunto subscribed our names.

CLARENCE WILBUR KUHN.
PHILIP RYAN.